Jan. 16, 1962  J. CUMMING  3,017,014
PLASTIC LINK CONVEYOR
Filed May 9, 1960  2 Sheets-Sheet 1
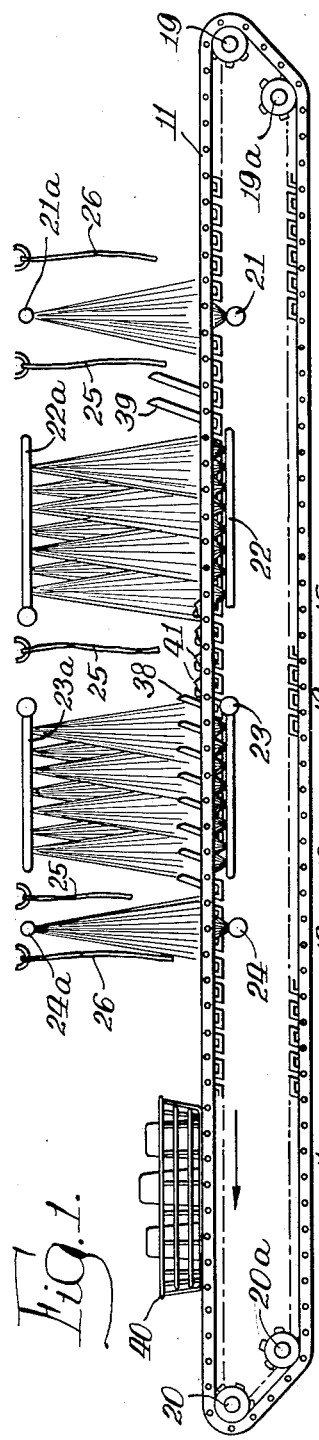
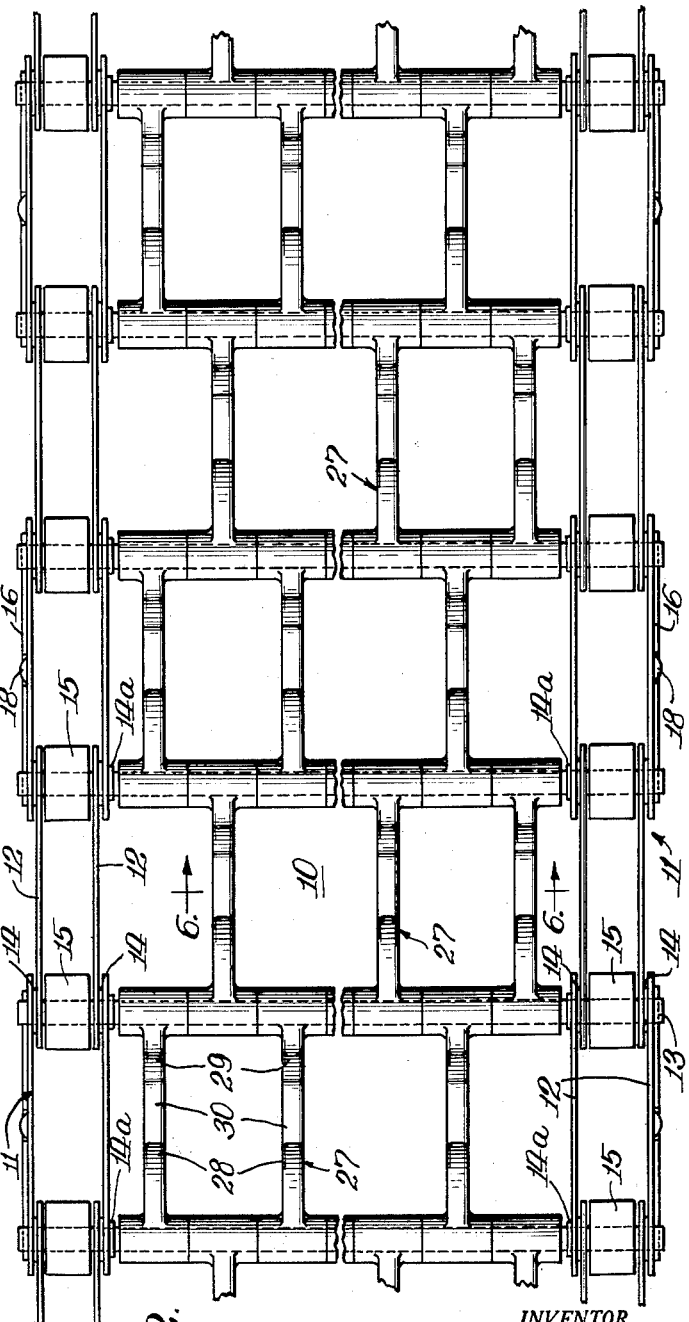
INVENTOR.
John Cumming,
BY Brown, Jackson,
Boettcher & Dienner
Attys.

Jan. 16, 1962   J. CUMMING   3,017,014
PLASTIC LINK CONVEYOR
Filed May 9, 1960   2 Sheets-Sheet 2
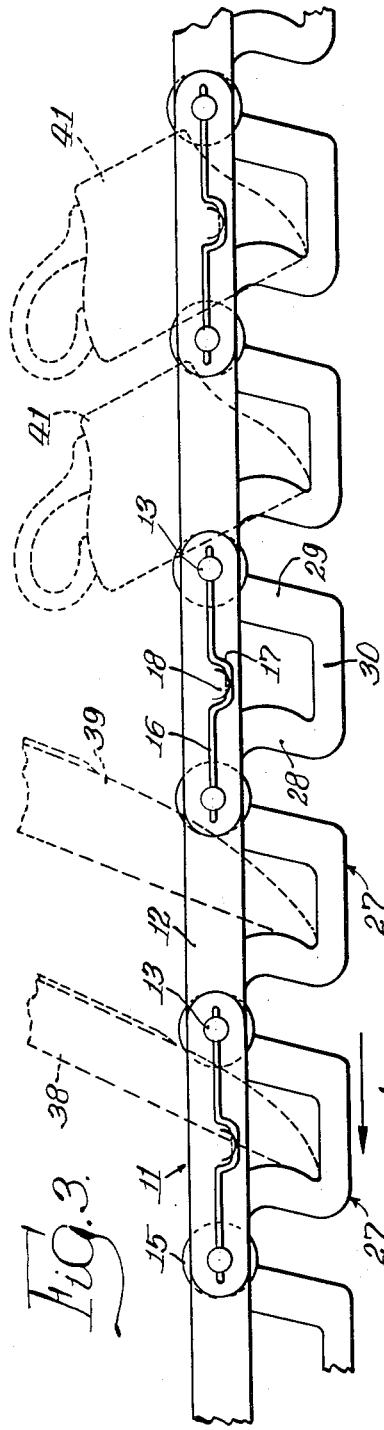
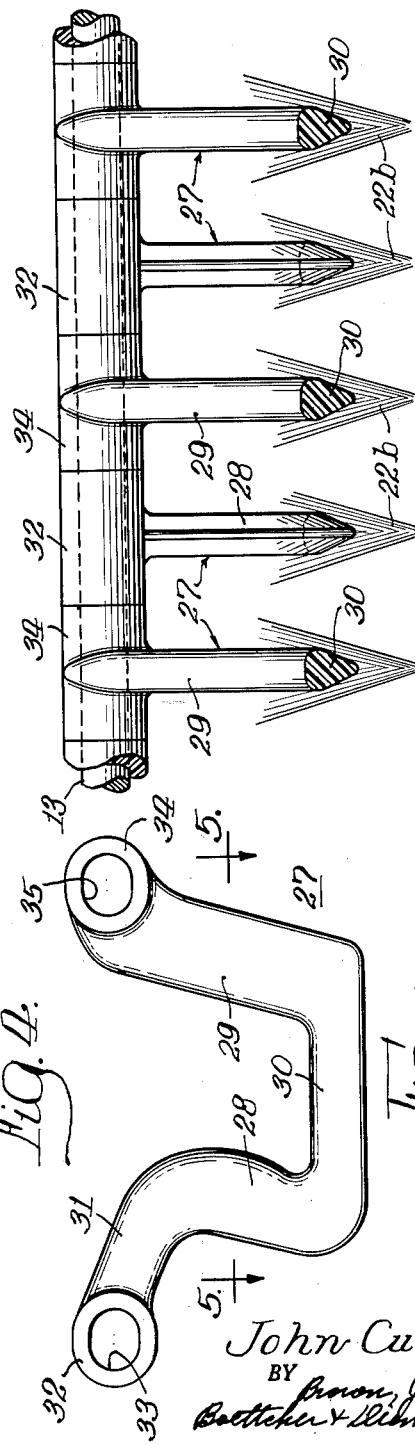
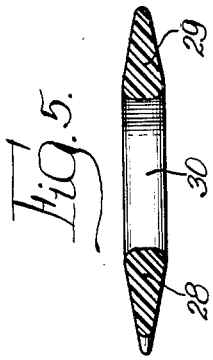
INVENTOR.
John Cumming,
BY
ATTYS.

United States Patent Office 3,017,014
Patented Jan. 16, 1962

3,017,014
PLASTIC LINK CONVEYOR
John Cumming, River Forest, Ill., assignor to G. S. Blakeslee & Co., Cicero, Ill., a corporation of Illinois
Filed May 9, 1960, Ser. No. 27,766
3 Claims. (Cl. 198—131)

This invention relates to endless conveyors intended for use in dishwashing machines and for analogous purposes.

In known types of dishwashing machines the dishes and other articles to be washed are transported by means of an endless conveyor and, during their travel through the machine, are subjected to washing and rinsing sprays projected upwardly through the upper run of the conveyor and downward from above the conveyor onto the dishes and other articles. In the known machines referred to the conveyor commonly is provided with elements, frequently termed pegs, which project upwardly from the upper run of the conveyor for supporting thereon dishes and other articles to be washed. Spoons, cutlery, tumblers and other smaller articles commonly are placed in wire trays which are set upon the conveyor so as to be supported by the pegs. That materially increases the distance of such articles above the lower spray means with the result that, in many cases, the articles supported in the basket or tray are not effectively washed due to the fact that the spray from beneath does not impinge upon such articles with appreciable force. The same difficulty is often experienced, though to less extent, with articles supported upon the upper run of the conveyor itself, due to the fact that the sprays from below the upper run are impeded or blocked by the conveyor structure itself, including the pegs for holding the articles. A further difficulty encountered in the known conveyors mentioned is that in many of such conveyors the means for holding the articles to be washed are formed of metal which often marks the dishes necessitating separate wiping thereof to remove such marks after the dishes have left the machine.

My invention is directed to a conveyor for use in dishwashing machines and the like which avoids the above noted objections to the known type of conveyors. To that end, I provide a conveyor having dish holding means extending between the runs of the conveyor so that the dishes held thereby extend in part below the plane of the upper run of the conveyor and are thus disposed nearer the lower spray means than in the presently known and used type of conveyors. Further, in the conveyor of my invention, the cross rods of the upper run thereof are disposed substantially in a common plane and the upper face of such run is unobstructed so that trays containing small articles to be washed may readily be slid onto and off of the upper run of the conveyor, the articles in such trays being disposed nearer the lower spray means than is the case where the trays are supported by pegs or fingers projecting above the upper run of the conveyor, above mentioned. A further and important object of my invention is the provision of plastic links connecting the cross rods of the conveyor and extending inwardly between the upper and the lower runs thereof for supporting the dishes or other articles in the manner above stated. The plastic links are so formed as to be of such extent or thickness as to possess ample mechanical strength for supporting the loads placed thereon while minimizing deflection or interference with the sprays projected from beneath the lower run of the conveyor, the plastic links possessing the further advantage that they eliminate marking of the articles supported thereby with the advantage that wiping of the articles to remove the marks therefrom is not necessary. Further objects and advantages of my invention will appear from the detail description.

In the drawings:

FIGURE 1 is a side view, partly broken away, of a conveyor and associated parts embodying my invention, for a dishwashing machine;

FIGURE 2 is a fragmentary plan view, on an enlarged scale and partly broken away, of the upper run of the conveyor of FIGURE 1;

FIGURE 3 is a fragmentary side view, on an enlarged scale, of the upper run of the conveyor of FIGURE 1;

FIGURE 4 is a side view, on an enlarged scale, of one of the body links of the conveyor of FIGURE 1;

FIGURE 5 is a sectional view taken substantially on line 5—5 of FIGURE 4; and

FIGURE 6 is a sectional view taken substantially on line 6—6 of FIGURE 2.

The conveyor comprises an inner or body portion 10 disposed between side drive chains 11 which may be of any suitable construction. As shown, the drive chains 11 are formed of inner and outer pairs of links 12 disposed with their end portions in overlapping relation. Cross rods 13, uniformly spaced lengthwise of the chains 11, project beyond body portion 10 and through the overlapping end portions of the links 12. The links 12 of the inner pairs thereof are spaced from the links of the outer pairs thereof by washers 14 and rollers 15 are appropriately mounted on the rods 13 between the inner links 12. The rods 13 project outwardly beyond the outer links of chains 11 and are provided with diametrical bores which receive the end portions of lock wires 16 each provided at its midportion with a U bend 17 which cooperates with a locking tab 18 struck from the corresponding outer chain link 12 for restraining wire 16 against endwise movement. A snap ring 14a, engaging in a corresponding groove in the cross rod 13, may be provided at the inner face of the inner one of the respective pairs of outer links 12 effective for restraining that link against inward movement along rod 13. The drive chains 11 pass about sprocket wheels 19 and 20 provided with projections or teeth suitably formed and disposed for engaging the rollers 15 for driving and guiding the conveyor. It may be assumed, for purposes of description, that the sprocket wheel 20 is driven counterclockwise, by suitable known means, as viewed in FIGURE 1, advancing the upper run of the conveyor toward the left. In practice, the washing machine is provided with tracks upon which the rollers 15 at the upper run of the conveyor travel for supporting that run in substantially horizontal position, as is known. Lower spray heads 21, 22, 23 and 24 are disposed beneath the upper run of the conveyor, such spray heads being opposed to upper spray heads 21a, 22a, 23a and 24a, respectively. The spray heads 21 and 21a are the pre-wash sprays, the spray heads 22 and 22a are the wash sprays, the spray heads 23 and 23a are the rinse sprays and the spray heads 24 and 24a are the final rinse sprays. The upper spray heads are separated by canvas curtains 25 therebetween, there being canvas curtains 26 adjacent the outer sides of the spray heads 21a and 24a. In practice, the conveyor and spray heads and associated parts are enclosed within a suitable housing including a portion of increased height enclosing the upper spray heads 21 to 24, inclusive, suitable means being provided for supplying rinse water and washing solution to the spray heads under appropriate pressure, as will be understood.

The body portion 10 of the conveyor comprises a plurality of body links 27 of substantially U-shape extending between and mounted on each two adjacent ones of the cross rods 13. The latter and the links 12 of the side drive chains 11 preferably are formed of stainless steel, the washers and lock wires and other small parts of the side chains 11 also preferably being formed of stainless steel. The rollers 15 may likewise be formed of stainless steel or of any suitable material. The links 27 are formed of a suitable plastic, preferably nylon. Referring more particularly to FIGURES 4, 5 and 6, each of the links 27 is of substantially U-shape and comprises a leading arm 28 and a following arm 29 joined at their inner ends by a connecting element 30. The leading arm 28 is provided at its upper end with an outwardly inclined neck 31 having at its outer end an integral hub or sleeve 32. The sleeve 32 is attached at its midlength to neck 31 and projects an equal distance beyond each side thereof. Sleeve 32 is provided with a lengthwise opening 33 of a vertical extent or height corresponding to the diameter of a cross rod 13 and is of somewhat greater extent horizontally, as will be clear from FIGURE 4. Arm 29 of link 27 is provided at its upper end with a transversely extending hub or sleeve 34 attached at its midlength to arm 29 and having an opening 35 of somewhat greater horizontal extent than its vertical extent, the latter corresponding to the diameter of a cross rod 13.

The links 27 extend between each two adjacent cross rods 13, with the sleeves 32 mounted on the leading one of such two cross rods and the sleeves 34 mounted on the following one of such two cross rods. It will be seen that the links 27 are thus arranged in rows transversely of the conveyor, one row of links being disposed between each two adjacent rods 13, with the leading arms 28 of the links 27 mounted on the leading one of such two cross rods and the following arms 29 of the links 27 mounted on the following one of such two cross rods. As will be clear from what has been said, and as shown in FIGURE 2, the sleeves 32 of each transverse row of links 27 fit between the sleeves 34 of the following arms 29 of the next adjacent row of links 27 thereby serving as spacers for the links of the transverse rows thereof. Mounting the links 27 on the cross rods 13 in the manner shown and described, disposes the links so that they extend inwardly of the conveyor, that is, into the space between the upper and the lower runs of the conveyor. As is shown more clearly in FIGURE 3, the links 27 at the upper run of the conveyor extend downwardly and provide downwardly extending and upwardly opening pockets for reception of dishes, such as plates 38 and platters 39 inserted edgewise into the links. The links 27 are so disposed that the arms 28 and 29 thereof are inclined, at the upper run of the conveyor, upwardly and away from the direction of travel of that run, indicated by the arrow in FIGURE 3, effective for retaining the plates and like articles in the links 27. A further advantage of disposing the links 27 in the manner shown and described is that the cross rods 13 at the upper run of the conveyor are disposed substantially in a common horizontal plane and the upper face of such upper run is unobstructed so that wire trays or baskets, such as the basket 40 shown in FIGURE 1, may be placed upon the upper run of the conveyor for travel therewith. That facilitates the handling of cutlery, tumblers, and smaller articles to be washed and has the further advantage that such articles may be disposed in proximity to the lower spray heads beneath the upper run of the conveyor, so as to be acted upon to best advantage by the sprays. A further advantage of having the links 27 extend downward from the upper run of the conveyor is that the articles supported by the links may be disposed in proximity to the lower spray heads so as to be acted upon to best advantage by the sprays.

The links 27 are formed of plastic, preferably nylon, as above noted. At times the links may be called upon to support large platters or other articles of substantial weight. They should be of ample mechanical strength to meet such conditions. That necessitates having the links of substantial extent in at least one direction to assure ample strength thereof. The required cross sectional area of the link could be attained by having the arms and the connecting member thereof of substantial width and breadth, but that would be objectionable as obstructing to substantial extent the sprays projected from the lower spray heads. That obviously would reduce the washing efficiency of the machine and would be objectionable for that reason. In order to avoid that difficulty, the elements of the link 27 are made of substantial width in the plane of the link with a corresponding reduction in the maximum thickness of such elements perpendicular to such plane. That will be understood more clearly by reference to FIGURES 4 to 6, inclusive. Referring to FIGURE 5, it will be noted that the arms 28 and 29 of the link 27 are of wedge shape in cross section, arm 28 tapering in thickness outwardly of the link, that is, in the direction of travel of the upper run of the conveyor, and arm 29 tapering rearwardly, that is, away from the direction of travel of the upper run of the conveyor. The connecting element 30 joining the lower ends of the arms 28 and 29 tapers downward in thickness, as shown in FIGURE 6, the arms 28 and 29 and element 30 being of elongated triangular cross section and tapering outwardly of the link 27 as shown, it being understood that neck 31 of the leading arm 28 is of the same cross section as the latter and tapers downwardly in thickness. That enables the links 27 to be of sufficient extent or width outwardly of the arms 28 and 29 and elements 30 thereof to support heavy loads while avoiding objectionable interference with the sprays, such as the sprays 22b, projected from beneath the upper run of the conveyor, the tapered arms 28 and 29 and elements 30 of the respective links 27 reducing to a minimum interference with the sprays and serving merely to deflect a portion of such sprays onto the dishes without objectionably blocking or obstructing the sprays, as shown in FIGURE 6. By constructing the links 27 in the manner stated I render it feasible to use links formed of nylon or analogous material which will not mark the dishes or other articles being washed. Further, the links and the sleeves thereof on the cross rods 13 effectively eliminate possibility of contact of the dishes with the metal parts of the conveyor thereby reducing liability of breakage. In that connection, it is understood, of course, that in placing the dishes or other articles in the conveyor they are positioned out of contact with the side drive chains 11 and other metallic parts. The elongated openings 33 and 35 in the sleeves 32 and 34, respectively, of the links 27 accommodate expansion and contraction thereof due to the temperature variations to which the links are subjected in the travel of the conveyor through the dishwashing machine. As shown in FIGURE 2, clearance is provided between the snap rings 14a and the outer ends of the adjacent sleeves of the links 27, such clearances accommodating endwise expansion and contraction of the sleeves 32 and 34 on the cross rods 13. The links 27 are well adapted for receiving flatware, such as plates, platters and the like inserted edgewise therein from above and are also well suited for receiving bowls or cups, such as cup 41, placed therein in inverted position with the upper portion of the cup resting upon the neck 31 of the leading arm 28, so that the cup is thus held at a decided inclination such as to assure drainage therefrom of the washing and rinse solutions or water.

The conveyor of my instant application is in the nature of an improvement over that of my copending application for Conveyor for Dishwashing Machine, Serial No. 787,599, filed January 19, 1959, now Patent No. 2,981,401, issued April 25, 1961.

As above indicated, it will be understood that changes in detail may be resorted to without departing from the field and scope of my invention, and I intend to include all such variations, as fall within the scope of the appended claims, in this application in which the preferred form only of my invention has been disclosed.

I claim:
1. In an endless conveyor for dish washing machines in which the articles to be washed are subjected to liquid sprays projected upward thereagainst from beneath the upper run of the conveyor, said conveyor having an upper run and a lower run and comprising side driving chains extending lengthwise of said conveyor, parallel rods connecting said chains and extending transversely of said conveyor and spaced apart lengthwise thereof, and a plurality of links of substantially U-shape lengthwise of said conveyor disposed between each two adjacent rods and spaced apart transversely of said conveyor, said links extending inwardly between said runs and respectively comprising a leading arm and a following arm and a connecting element joining the inner ends of said arms, the latter and said connecting element being of substantially V-shape in cross section and tapering in thickness outwardly of the link, the connecting elements of the links at the upper run of said conveyor having upwardly diverging side surfaces effective for deflecting the upwardly projected sprays onto the dishes thereby precluding blocking of such sprays while assuring impingement thereof upon the dishes throughout the full width of said upper run, the leading arms of said links being pivoted on one of said two adjacent rods and the following arms of said links being pivoted on the other of said two adjacent rods, said links being open and unobstructed at their sides for downward insertion thereinto of dishes from the upper run of said conveyor and said rods being substantially in a common plane at the upper run of said conveyor.

2. In an endless conveyor for dish washing machines in which the articles to be washed are subjected to liquid sprays projected upward thereagainst from beneath the upper run of the conveyor, said conveyor having an upper run and a lower run and comprising side driving chains extending lengthwise of said conveyor, parallel rods connecting said chains and extending transversely of said conveyor and spaced apart lengthwise thereof, and a plurality of links of substantially U-shape lengthwise of said conveyor disposed between each two adjacent rods and spaced apart transversely of said conveyor, said links being formed of plastic and extending inwardly between said runs and respectively comprising a leading arm and a following arm and a connecting element joining the inner ends of said arms, the latter and said connecting element being of substantially V-shape in cross section and tapering in thickness outwardly of the link, the connecting elements of the links at the upper run of said conveyor having upwardly diverging side surfaces effective for deflecting the upwardly projected sprays onto the dishes thereby precluding blocking of such sprays while assuring impingement thereof upon the dishes throughout the full width of said upper run, the leading arms of said links being pivoted on one of said two adjacent rods and the following arms of said links being pivoted on the other of said two adjacent rods, said links being open and unobstructed at their sides for downward insertion thereinto of dishes from the upper run of said conveyor and said rods being substantially in a common plane at the upper run of said conveyor.

3. In an endless conveyor for dish washing machines in which the articles to be washed are subjected to liquid sprays projected upward thereagainst from beneath the upper run of the conveyor, said conveyor having an upper run and a lower run and comprising side driving chains extending lengthwise of said conveyor, parallel rods connecting said chains and extending transversely of said conveyor and spaced apart lengthwise thereof, and a plurality of links of substantially U-shape lengthwise of said conveyor disposed between each of two adjacent rods and spaced apart transversely of said conveyor, said links being formed of plastic and extending inwardly between said runs and respectively comprising a leading arm and a following arm and a connecting element joining the inner ends of said arms, said connecting element being of substantially V-shape in cross section and tapering in thickness outwardly of the link, the connecting elements of the links at the upper run of said conveyor having upwardly diverging side surfaces effective for deflecting the upwardly projected sprays onto the dishes thereby precluding blocking of such sprays while assuring impingement thereof upon the dishes throughout the full width of said upper run, the leading arms of said links being pivoted on one of said two adjacent rods and the following arms of said links being pivoted on the other of said two adjacent rods, said links being open and unobstructed at their sides for downward insertion thereinto of dishes from the upper run of said conveyor and said rods being substantially in a common plane at the upper run of said conveyor.

References Cited in the file of this patent
UNITED STATES PATENTS

| | | |
|---|---|---|
| 1,426,179 | Glass | Aug. 15, 1922 |
| 1,934,250 | Wynne et al. | Nov. 7, 1933 |
| 2,044,744 | Hansen | June 16, 1936 |
| 2,667,262 | Davis | Jan. 26, 1954 |
| 2,884,935 | Fox | May 5, 1959 |
| 2,981,401 | Cumming | Apr. 25, 1961 |